US010200923B2

(12) United States Patent
Godin et al.

(10) Patent No.: US 10,200,923 B2
(45) Date of Patent: Feb. 5, 2019

(54) ENHANCED INDICATION OF NETWORK SUPPORT OF SRVCC AND/OR VOICE-OVER-IMS FOR AN USER EQUIPMENT IN AN EPS NETWORK

(71) Applicant: Alcatel Lucent, Boulogne Billancourt (FR)

(72) Inventors: Philippe Godin, Nozay (FR); Sudeep Palat, Swindon (GB)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 14/355,678

(22) PCT Filed: Oct. 24, 2012

(86) PCT No.: PCT/EP2012/071033
§ 371 (c)(1),
(2) Date: May 1, 2014

(87) PCT Pub. No.: WO2013/064401
PCT Pub. Date: May 10, 2013

(65) Prior Publication Data
US 2014/0321428 A1     Oct. 30, 2014

(30) Foreign Application Priority Data
Nov. 4, 2011    (EP) ..................................... 11290513

(51) Int. Cl.
*H04W 36/10*     (2009.01)
*H04W 36/00*     (2009.01)
(Continued)

(52) U.S. Cl.
CPC ......... *H04W 36/10* (2013.01); *H04L 65/1016* (2013.01); *H04W 36/0022* (2013.01); *H04W 92/12* (2013.01)

(58) Field of Classification Search
CPC ............ H04W 36/14; H04W 36/0016; H04W 36/0066; H04W 8/26; H04W 36/0022;
(Continued)

(56) References Cited

U.S. PATENT DOCUMENTS

2004/0266435 A1*  12/2004  de Jong ................ H04W 36/14
                                                              455/436
2007/0201430 A1*   8/2007  Holmstrom ......... H04W 76/025
                                                              370/352
(Continued)

FOREIGN PATENT DOCUMENTS

CN      101983525          3/2011
CN      102187708 A1       9/2011
(Continued)

OTHER PUBLICATIONS

NTT Docomo, "AS/NAS SRVCC capability bits and voice domain selection," SA WG2 Temporary Document, SA WG2 Meeting #87, Oct. 10-14, 2011, Jeju Island, South Korea, S2-113999, Document for: Discussion / Approval, 4 pages.
(Continued)

*Primary Examiner* — Jung Liu
*Assistant Examiner* — Jung-Jen Liu
(74) *Attorney, Agent, or Firm* — Fay Sharpe LLP

(57) ABSTRACT

Embodiments of the present invention include a method for enhanced indication of network support of SRVCC and/or Voice-over-IMS for an User Equipment UE in an Evolved Packet System EPS network, said method comprising at least one step based on taking into account support of SRVCC and/or Voice-over-IMS by Radio Access Network RAN nodes and/or by Radio Access Technologies RATs available for SRVCC for said UE in said EPS network.

26 Claims, 1 Drawing Sheet

Figure 1:
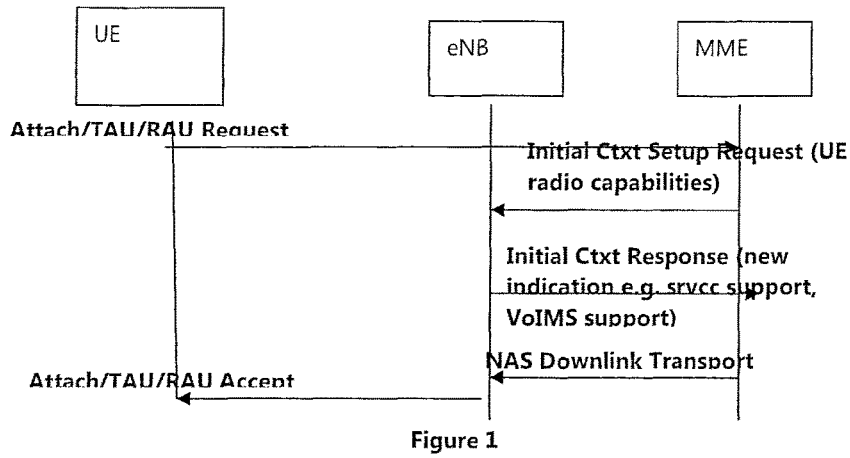

(51) Int. Cl.
*H04L 29/06* (2006.01)
*H04W 92/12* (2009.01)

(58) Field of Classification Search
CPC ... H04W 36/02; H04W 36/023; H04W 36/08; H04W 76/045; H04W 36/30; H04W 36/022; H04W 36/28
See application file for complete search history.

(56) References Cited

U.S. PATENT DOCUMENTS

| | | | | |
|---|---|---|---|---|
| 2009/0175241 A1* | 7/2009 | Ohta | .................... | H04W 36/02 370/331 |
| 2010/0040020 A1 | 2/2010 | Chen | | |
| 2010/0165948 A1* | 7/2010 | Ore | .................... | H04W 36/0033 370/331 |
| 2010/0197315 A1* | 8/2010 | Lindstrom | ............ | H04W 48/08 455/450 |
| 2010/0290433 A1* | 11/2010 | Stojanovski | ...... | H04W 36/0022 370/331 |
| 2010/0329244 A1 | 12/2010 | Buckley et al. | | |
| 2011/0122817 A1* | 5/2011 | Russell | ................ | H04W 60/04 370/328 |
| 2011/0164564 A1* | 7/2011 | Vedrine | ............ | H04W 36/0033 370/328 |
| 2011/0171924 A1* | 7/2011 | Faccin | .................... | H04W 4/22 455/404.1 |
| 2011/0171953 A1* | 7/2011 | Faccin | ................ | H04W 48/08 455/426.1 |
| 2011/0199898 A1* | 8/2011 | Cho | .................... | H04W 48/06 370/230 |
| 2011/0268085 A1* | 11/2011 | Barany | ............ | H04W 36/0033 370/331 |
| 2013/0142168 A1* | 6/2013 | Vedrine | ............ | H04W 36/0022 370/331 |
| 2013/0143565 A1* | 6/2013 | Zisimopoulos | ....... | H04W 36/14 455/436 |
| 2015/0079992 A1* | 3/2015 | Kaura | ................ | H04W 68/005 455/436 |
| 2015/0156677 A1* | 6/2015 | Vedrine | ............ | H04W 36/0022 370/331 |

FOREIGN PATENT DOCUMENTS

| | | |
|---|---|---|
| TW | 201043057 | 12/2010 |
| TW | 201108788 | 3/2011 |
| TW | 201108789 | 3/2011 |
| WO | 2009/093946 A1 | 7/2009 |
| WO | 2009/121745 | 10/2009 |
| WO | WO 2009/121745 A1 | 10/2009 |
| WO | 2010/044730 A1 | 4/2010 |
| WO | WO 2010/044730 A2 | 4/2010 |
| WO | 2010/147527 A1 | 12/2010 |
| WO | 2011088066 | 7/2011 |
| WO | 2011102624 | 8/2011 |
| WO | 2011132927 | 10/2011 |

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0, pp. 1-279, XP050476358, (Mar. 2011).
"3$^{rd}$ Generation Partnership Project; Technical Specification Group Services and System Aspects; Single Radio Voice Call Continuity (SRVCC); Stage 2 (Release 9)," 3GPP TS 23.216 V9.2.0, pp. 1-42, XP050400590, (Dec. 2009).
International Search Report for PCT/EP2012/071033 dated Jan. 16, 2013.
3GPP TS 23.401 v10.5.0 (Sep. 2011)—3rd Generation Partnership Project; Technical Specification Group Services and System Aspects; General Packet Radio Service (GPRS) enhancements for Evolved Universal Terrestrial Radio Access Network (E-UTRAN) access (Release 10), pp. 1-282.
3GPP TS 23.216 v11.1.0 (Jun. 2011)—3rd Generation Partnership Project; Technical Specification Group Services and System Aspects; Single Radio Voice Call Continuity (SRVCC); Stage 2 (Release 11), pp. 1-52.

\* cited by examiner

ENHANCED INDICATION OF NETWORK SUPPORT OF SRVCC AND/OR VOICE-OVER-IMS FOR AN USER EQUIPMENT IN AN EPS NETWORK

The present invention generally relates to mobile communication networks and systems.

Detailed descriptions of mobile communication networks and systems can be found in the literature, in particular in Technical Specifications published by standardization bodies such as in particular 3GPP ($3^{rd}$ Generation Partnership Project).

In such systems a mobile terminal (or User Equipment) has access, via an Access Network, to a Core Network providing communication services.

An example of 3GPP system is 3G-LTE system, also called Evolved Packet System EPS, specified in particular in 3GPP TS 23.401. EPS includes Evolved Packet Core EPC providing IP connectivity services to an User Equipment UE. EPC can be accessed by different Access Networks, including 3GPP Radio Access Networks (such as E-UTRAN or GERAN/UTRAN) and non-3GPP Access Networks.

In EPS, CS (Circuit-Switched) services (such as in particular voice services) can be delivered as IP-based services, via PS (Packet-Switched) domain EPC providing IP connectivity to an operator's IMS network. Such functionality is also referred to as "Voice-over-IMS" (VoIMS), or "IMS voice over PS session".

On the contrary, in systems such as 2G-GSM or 3G-UMTS, CS services (such as for example voice services) can be delivered via CS (Circuit-Switched) domain.

Single Radio Voice Call Continuity SRVCC provides voice call continuity between IMS over Packet Switched PS access and Circuit Switched CS access for calls that are anchored in IMS when the User Equipment UE is capable of transmitting/receiving on only one of those access networks at a given time. SRVCC functionality is specified in particular in 3GPP TS 23.216. SRVCC can be performed from E-UTRAN to different Radio Access Networks RANs or Radio Access Technologies RATs, such as in particular 3GPP GERAN or UTRAN.

As specified in particular in 3GPP 23.216, an SRVCC-capable UE includes an SRVCC capability indication in an Attach Request message sent to a Mobility Management Entity (MME) in EPC during an Attach or mobility management procedure, and the MME includes a "SRVCC operation possible" indication in a Initial Context Setup Request sent to the eNode B (in E-UTRAN), meaning that both UE and MME are SRVCC-capable. As specified in particular in 3GPP TS 23.401 and 24.301, the MME also informs the UE about network support of IMS voice over PS session, with an IMS voice over PS session indicator.

As recognized by the inventor, and as will be explained with more detail later, there is a need to improve such indication of Voice-over-IMS and/or SRVCC network support. More generally, there is a need to improve voice services support in EPS.

Embodiments of the present invention in particular addresses such needs.

These and other objects are achieved, in one aspect, by a method for enhanced indication of network/UE support of SRVCC and/or Voice-over-IMS for an User Equipment UE in an Evolved Packet System EPS network.

In an embodiment, said method comprises at least one step based on taking into account support of SRVCC and/or Voice-over-IMS by Radio Access Network RAN nodes and/or by Radio Access Technologies RATs available for SRVCC for said UE in said EPS network.

These and other objects are achieved, in other aspects, by entities for performing such method, said entities including, in particular E-UTRAN entity (eNodeB), and EPC entity (Mobility Management Entity MME).

Figure 2:
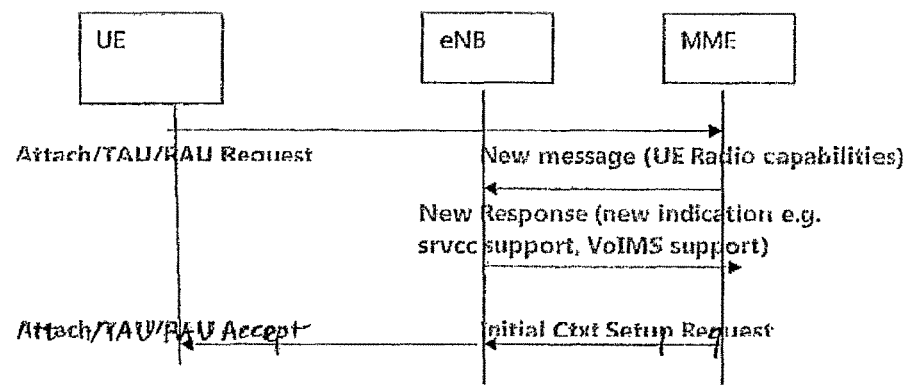

Some embodiments of apparatus and/or methods in accordance with embodiments of the present invention are now described, by way of example only, and with reference to the accompanying drawings, in which:

FIG. 1 is intended to illustrate in a simplified way an Attach or Tracking Area Update procedure, enhanced according to a first embodiment of the present invention, FIG. 2 is intended to illustrate in a simplified way an Attach or Tracking Area Update procedure, enhanced according to a second embodiment of the present invention.

As recalled above, currently the UE sends its global UTRAN/GERAN srvcc capability to the MME at NAS level. This capability is used by the MME together with the EPC srvcc support in order to decide whether to indicate "VoIMS possible" or "VoIMS not supported" back to the UE over NAS in the Attach/TAU/RAU Accept message. This indication is also provided to the eNB in the S1 Initial Context Request message within the SRVCC indication Information element so that whenever an SRVCC is necessary the eNB knows whether MME and UE supports it.

In case the srvcc is from lte to umts, one problem comes if the target RAN node doesn't support SRVCC. Indeed, the support of incoming srvcc by an RNC requires some specific function. Since the MME is not necessarily aware of this target RNC capability but the source eNB is e.g. by configuration, the "VoIMS possible" or "VoIMS not supported" indication currently sent to the UE over NAS may not take it into account. Thus the MME can perfectly indicate "VoIMS possible" to the UE, leading to VoIMS call being established while the target UTRAN doesn't support srvcc. As a result, at time of handover the eNB cannot perform this srvcc which likely leads to release the call so that the UE can catch up 3 g again. Another problem is also when the UE has indicated its general UTRAN/GERAN SRVCC capability to the MME but has not been tested for one of the two (either GERAN or UTRAN). The source eNB would be aware of it (so called FGI bits received by eNB from UE) but not the MME again. To solve these two problems it is necessary to send some information from source eNB to MME before the MME does decide to send to the UE over the NAS the "VoIMS possible" or "VoIMS not supported" indication.

Embodiments of the present invention in particular enable to solve such problems and/or avoid such drawbacks.

Embodiments of the present invention in particular take advantage of the fact that the source LTE eNB is aware e.g. by configuration whether a target RNC supports srvcc or not.

Embodiments of the present invention include providing the target RNC srvcc capability from eNB to the MME (for the lte to umts srvcc case).

The sending of the capability from the eNB to the MME must be early enough so that the MME is made aware before making the decision "VoIMS possible" or not to be sent to the UE. The target RNC srvcc capability can be sent from eNB to MME over a UE-dedicated message such as the UE Capability Info Indication message or the Initial Context Response message or any new UE-dedicated uplink S1AP message.

Embodiments of the invention can be extended to the case where the target RNC capability is provided from eNB to MME in a non-UE dedicated uplink S1 message such S1 Setup Request or a new non-UE dedicated uplink message.

Embodiments of the invention can be extended to cover other RATs i.e. to provide any target RAT RAN srvcc capability from eNB to MME e.g. for GERAN, CDMA including capability concerning multiple RATs at the same time.

Embodiments of the invention can also be extended to cover any Access Stratum (AS) information that the eNB has which would be needed/useful by the MME in its decision to allow the UE for "VoIMS possible" or not. For example, one such information may be related to the FGI bit i.e. the eNB is made aware by the UE whether the srvcc support towards a given RAT has been implemented and tested or not.

Embodiments of the invention can also be extended to cover the sending from the eNB to the MME of the support of "VoIMS capability" on the target RAN and RAT: this one would be useful in the context of a full VoIMS deployment scenario because the MME could decide to allow the UE to start VoIMS calls knowing the wide support of VoIMS on all RATs and RAN nodes even though srvcc is not supported. The sending of this VoIMS capability support could also be per UE to cover cases such as the eNB checks per UE if the frequency band where the target RAT supports VoIMS is a frequency band also supported by the UE. By further extension to cover any case where the operation of the VoIMS by the UE on the target RAN/RAT node depends on some radio capabilities of the UE which are known by the eNB.

In embodiments of the present invention providing a sending by the eNB to the MME of either "srvcc support" or "VoIMS support" on a target RAT/RAN node which depends on a per UE radio capability of the involved UE, two embodiments may be envisioned:

In a first embodiment, since the eNB receives the UE Radio Capabilities within the Initial Context Setup Request message or later, the new indication from eNB to MME would be sent after that e.g. in Initial Context Setup Response or in a new message, and the Attach Accept/TAU/RAU Accept towards the UE would be sent only after that, embedded in an S1AP Downlink NAS Transport.

In a second embodiment, after receiving the Initial UE Message, the MME could trigger a new class 1 procedure where a new S1 downlink message first sends the UE Radio capabilities to the eNB, then eNB responds with the new indication from eNB to MME, then the MME sends the Attach/TAU/RAU Accept towards the UE within the S1AP Initial Context Setup Request message.

The first embodiment is illustrated in a simplified way in FIG. 1. In the scenario in FIG. 1, the first embodiment is represented whereby the Attach/TAU/RAU Accept message would be sent after and separate of Initial Context Setup Request.

The second embodiment is illustrated in a simplified way in FIG. 2. In FIG. 2 the second embodiment is represented allowing MME to send the Attach/TAU/RAU Accept message within the Initial Context Setup Request.

Embodiments of the invention allow the MME to make the right decision whether to authorize a UE to use VoIMS or not depending on the target RAT or target RAN nodes capabilities (wrt "srvcc support" or "VoIMS support") or even depending on some specific radio characteristics supported by the UE and known by eNB (FGI bits, supported frequency bands, etc. . . . ).

On the contrary, in the prior art, the MME may decide to send "VoIMS possible" to a UE in the Attach/TAU/RAU Accept message allowing the UE to start VoIMS calls which are likely to get dropped whenever handover to target RAT/RAN node becomes necessary due to non support of "srvcc" or non support of "VoIMS" at this target RAT/RAN node.

In one aspect, there is provided a method for enhanced indication of network support of SRVCC and/or Voice-over-IMS for an User Equipment UE in an Evolved Packet System EPS network.

In an embodiment, said method comprises at least one step based on taking into account support of SRVCC and/or Voice-over-IMS by Radio Access Network RAN nodes and/or by Radio Access Technologies RATs available for SRVCC for said UE in said EPS network.

In an embodiment, said method comprises a step of:
an eNodeB serving said UE signalling to a Mobility Management Entity MME serving said UE, information as to said Voice-over-IMS and/or SRVCC support by Radio Access Network RAN nodes and/or Radio Access Technologies RATs available for SRVCC for said UE in said EPS network, referred to as Radio Access Network RAN-level-support information.

In an embodiment, said method comprises a step of:
said eNodeB signalling said RAN-level-support information to said MME during an Attach procedure or a mobility management procedure for said UE.

In an embodiment, said method comprises a step of:
said eNodeB signalling said RAN-level support information to said MME, in a message Initial Context Setup Response.

In an embodiment, said method comprises a step of:
said eNodeB signalling said RAN-level support information to said MME, in a dedicated message.

In an embodiment, said method comprises a step of:
said eNodeB determining information as to said Voice-over-IMS and/or SRVCC support by RAN nodes and/or Radio Access Technologies RATs available for SRVCC for said UE in said EPS network, referred to as Radio Access Network RAN-level-support information.

In an embodiment, said method comprises a step of:
said eNodeB determining said RAN-level-support information, using information as to radio capabilities of said UE, and/or RAN configuration information.

In an embodiment, said method comprises a step of:
a Mobility Management MME serving said UE signalling said information as to radio capabilities of said UE to said eNodeB.

In an embodiment, said method comprises a step of:
said MME signalling said information as to radio capabilities of said UE to said eNodeB during an Attach procedure or a mobility management procedure for said UE.

In an embodiment, said method comprises a step of:
said MME signalling said information as to radio capabilities of said UE to said eNodeB in a message Initial Context Setup Request.

In an embodiment, said method comprises a step of:
said MME signalling said information as to radio capabilities of said UE to said eNodeB in a dedicated message.

In an embodiment, said method comprises a step of:
a Mobility Management Entity MME serving said UE sending a Voice-over-IMS support indication to said UE, indicating Voice-over-IMS supported, if Voice-over-IMS is supported by Evolved Packet Core EPC, and if either Voice-over-IMS or SRVCC is supported by at least one of said available RAN nodes and/or RATs.

In an embodiment, said method comprises a step of:
a Mobility Management Entity MME serving said UE sending an SRVCC support indication to an eNodeB serving said UE, indicating SRVCC supported, if SRVCC is supported by Evolved Packet Core EPC and by at least one of said available RAN nodes and/or RATs.

Other aspects relate to entities comprising means for performing such method, said entities including, in particular E-UTRAN entity (eNodeB), and EPC entity (Mobility Management Entity MME).

In one aspect, there is provided an eNode B serving an UE in an EPS network, said eNodeB comprising:
means for signalling to a Mobility Management Entity MME serving said UE, information as to Voice-over-IMS and/or SRVCC support by RAN nodes and/or Radio Access Technologies RATs available for SRVCC for said UE in said EPS network, referred to as Radio Access Network RAN-level-support information.

In an embodiment, said eNode B comprises:
means for signalling said RAN-level-support information to a Mobility Management MME serving said UE, during an Attach procedure or a mobility management procedure for said UE.

In an embodiment, said eNode B comprises:
means for signalling said RAN-level support information to said MME, in a message Initial Context Setup Response.

In an embodiment, said eNode B comprises:
means for signalling said RAN-level support information to said MME, in a dedicated message.

In an embodiment, said eNode B comprises:
means for determining information as to said Voice-over-IMS and/or SRVCC support by RAN nodes and/or Radio Access Technologies RATs available for SRVCC for said UE in said EPS network, referred to as Radio Access Network RAN-level-support information.

In an embodiment, said eNode B comprises:
means for determining said RAN-level-support information, using information as to radio capabilities of said UE, and/or RAN configuration information.

In another aspect, there is provided a Mobility Management Entity MME serving an UE in an EPS network, said MME comprising:
means for signalling information as to radio capabilities of said UE to an eNodeB serving said UE.

In an embodiment, said MME comprises:
means for signalling said information as to radio capabilities of said UE to said eNodeB during an Attach procedure or a mobility management procedure for said UE.

In an embodiment, said MME comprises:
means for signalling said information as to radio capabilities of said UE to said eNodeB in a message Initial Context Setup Request.

In an embodiment, said MME comprises:
means for signalling said information as to radio capabilities of said UE to said eNodeB in a dedicated message.

In another aspect, there is provided a Mobility Management Entity MME serving an UE in an EPS network, said MME comprising:
means for sending a Voice-over-IMS support indication to said UE, indicating Voice-over-IMS supported, if Voice-over-IMS is supported by Evolved Packet Core EPC, and if either Voice-over-IMS or SRVCC is supported by at least one of RAN nodes and/or RATs available for SRVCC for said UE in said EPS network.

In another aspect, there is provided a Mobility Management Entity MME serving an UE in an EPS network, said MME comprising:
means for sending an SRVCC support indication to an eNodeB serving said UE, indicating SRVCC supported, if SRVCC is supported by Evolved Packet Core EPC and by at least one of said available RAN nodes and/or RATs available for SRVCC for said UE in said EPS network.

The detailed implementation of the above-mentioned means does not raise any special problem for a person skilled in the art, and therefore such means do not need to be more fully disclosed than has been made above, by their function, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for enhanced indication of network support of SRVCC and/or Voice-over-IMS for an User Equipment UE (UE) in an Evolved Packet System EPS network, said method comprising taking into account support of SRVCC and/or Voice-over-IMS by Radio Access Network RAN nodes, said method comprising:
an eNodeB serving said UE signalling to a Mobility Management Entity MME (MME) serving said UE, information as to said Voice-over-IMS and/or SRVCC support by RAN nodes, wherein the information as to said Voice-over-IMS and/or SRVCC support by RAN nodes comprises Radio Access Network RAN-level-support information, and
said MME sending to said UE a Voice-over-IMS support indication, indicating Voice-over-IMS supported or Voice-over-IMS not supported, taking into account said RAN-level support information received from said eNodeB.

2. A method according to claim 1, comprising a step of:
said eNodeB signalling said RAN-level-support information to said MME during an Attach procedure or a mobility management procedure for said UE.

3. A method according to claim 1, comprising a step of:
said eNodeB signalling said RAN-level support information to said MME in a dedicated message.

4. A method according to claim 1, comprising a step of:
said eNodeB determining the information as to said Voice-over-IMS and/or SRVCC support by RAN nodes.

5. A method according to claim 4, comprising a step of:
said eNodeB determining said RAN-level-support information using information as to radio capabilities of said UE, and/or RAN configuration information.

6. A method according to claim 5, comprising a step of:
said MME signalling said information as to radio capabilities of said UE to said eNodeB.

7. A method according to claim 6, comprising a step of:
said MME signalling said information as to radio capabilities of said UE to said eNodeB during an Attach procedure or a mobility management procedure for said UE.

8. A method according to claim 7, comprising a step of:
said MME signalling said information as to radio capabilities of said UE to said eNodeB in a dedicated message.

9. A method according to claim 1, comprising:
said MME triggering a procedure whereby the UE radio capabilities are first sent to the eNodeB in a downlink S1 message, and then the eNodeB responding with said RAN-level-support information sent to said MME.

10. An eNodeB comprising:
a processor; and
memory storing instructions that, when executed, cause the eNodeB to:
signal to a Mobility Management Entity MME (MME) serving an User Equipment UE (UE) served by said eNodeB in an Evolved Packet System EPS network, information as to Voice-over-IMS and/or SRVCC support by Radio Access Network RAN nodes, wherein the information as to Voice-over-IMS and/or SRVCC support by Radio Access Network RAN nodes comprises Radio Access Network RAN-level-support information, said signalling allowing a Voice-over-IMS indication indicating Voice-over-IMS supported or Voice-over-IMS not supported sent by said MME to said UE to take said RAN-level-support information into account.

11. An eNodeB according to claim 10, wherein the instructions, when executed, further cause the eNodeB to:
signal said RAN-level-support information to said MME during an Attach procedure or a mobility management procedure for said UE.

12. An eNodeB according to claim 10, wherein the instructions, when executed, further cause the eNodeB to:
signal said RAN-level support information to said MME in a dedicated message.

13. An eNodeB according to claim 10, wherein the instructions, when executed, further cause the eNodeB to:
determine said RAN-level support information.

14. An eNodeB according to claim 13, the instructions, when executed, further cause the eNodeB to:
determine said RAN-level-support information using information as to radio capabilities of said UE, and/or RAN configuration information.

15. An eNodeB according to claim 14, wherein the instructions, when executed, further cause the eNodeB to:
receive information as to radio capabilities of said UE signalled to said eNodeB by said MME.

16. An eNodeB according to claim 14, wherein the instructions, when executed, further cause the eNodeB to:
receive information as to radio capabilities of said UE signalled to said eNodeB by said MME during an Attach procedure or a mobility management procedure for said UE.

17. An eNodeB according to claim 14, wherein the instructions, when executed, further cause the eNodeB to:
receive information as to radio capabilities of said UE signalled to said eNodeB by said MME in a dedicated message.

18. An eNodeB according to claim 10, wherein the instructions, when executed, further cause the eNodeB to:
during a procedure triggered by said MME, first receive UE radio capabilities in a downlink S1 message, and then respond with said RAN-level-support information sent to said MME.

19. A Mobility Management Entity MME (MME), comprising:
a processor; and
memory storing instructions that, when executed, cause the MME to:
receive from an eNodeB serving a User Equipment UE (UE) served by said MME in an Evolved Packet System EPS network, information as to Voice-over-IMS and/or SRVCC support by Radio Access Network RAN nodes, wherein the information as to Voice-over-IMS and/or SRVCC support by Radio Access Network RAN nodes comprises Radio Access Network RAN-level-support information, and
send to said UE a Voice-over-IMS support indication, indicating Voice-over-IMS supported or Voice-over-IMS not supported, taking into account said RAN-level support information.

20. A Mobility Management Entity according to claim 19, wherein the instructions, when executed, further cause the MME to:
receive said RAN-level-support information during an Attach procedure or a mobility management procedure for said UE.

21. A Mobility Management Entity according to claim 19, wherein the instructions, when executed, further cause the MME to:
receive said RAN-level support information in a dedicated message.

22. A Mobility Management Entity according to claim 19, wherein the instructions, when executed, further cause the MME to:
signal information as to radio capabilities of said UE to said eNodeB.

23. A Mobility Management Entity according to claim 22, wherein the instructions, when executed, further cause the MME to:
signal said information as to radio capabilities of said UE to said eNodeB during an Attach procedure or a mobility management procedure for said UE.

24. A Mobility Management Entity according to claim 22, wherein the instructions, when executed, further cause the MME to:
signal said information as to radio capabilities of said UE to said eNodeB in a dedicated message.

25. A Mobility Management Entity according to claim 19, wherein the instructions, when executed, further cause the MME to:
trigger a procedure whereby UE radio capabilities are first sent to the eNodeB in a downlink S1 message, and then the MME receives said RAN-level-support information from said eNodeB.

26. A Mobility Management Entity according to claim 19, wherein the RAN-level support information takes into account information as to radio capabilities of said UE and/or RAN configuration information.

* * * * *